United States Patent
Grosman et al.

(10) Patent No.: US 9,633,070 B2
(45) Date of Patent: Apr. 25, 2017

(54) INCREASE DATABASE PERFORMANCE BY REDUCING REQUIRED COMMUNICATIONS AND INFORMATION TRANSFERS

(71) Applicant: International Business Machines Corporation, Armonk, NY (US)

(72) Inventors: Ronen Grosman, Markham (CA); Matthew A. Huras, Ajax (CA); Bret R. Olszewski, Austin, TX (US); Keriley K. Romanufa, Scarborough (CA); Aamer U. Sachedina, Queensville (CA); Xun Xue, Markham (CA)

(73) Assignee: International Business Machines Corporation, Armonk, NY (US)

(*) Notice: Subject to any disclaimer, the term of this patent is extended or adjusted under 35 U.S.C. 154(b) by 314 days.

(21) Appl. No.: 14/230,185

(22) Filed: Mar. 31, 2014

(65) Prior Publication Data
US 2015/0278291 A1    Oct. 1, 2015

(51) Int. Cl.
*G06F 15/16*    (2006.01)
*G06F 17/30*    (2006.01)

(52) U.S. Cl.
CPC .. *G06F 17/30377* (2013.01); *G06F 17/30171* (2013.01); *G06F 17/30362* (2013.01); *G06F 17/30466* (2013.01)

(58) Field of Classification Search
CPC ......... G06F 17/30171; G06F 17/30466; G06F 17/30362; G06F 17/30377

(Continued)

(56) References Cited

U.S. PATENT DOCUMENTS 5,327,556 A * 7/1994 Mohan .............. G06F 17/30171
 707/704
5,734,898 A * 3/1998 He ........................... G06F 9/52
 707/999.203

(Continued)

OTHER PUBLICATIONS

R. Elmasri and S. B. Navathe. Fundamentals of Database Systems (third edition). Addison-Wesley, New York, Jun. 2000, Title Pages, Preface, Sections 7.1-7.4 and Chapter 8, pp. iii, iv, vii, viii, 195-225 and 243-288.*

(Continued)

*Primary Examiner* — Usmaan Saeed
*Assistant Examiner* — Brian E. Weinrich
(74) *Attorney, Agent, or Firm* — David B. Woycechowsky

(57) ABSTRACT

According to embodiments of the present invention, one or more computer processors determine that a predetermined workload threshold associated with an invalidated object is not exceeded and transmits an invalidation command associated with the invalidated object to the owner of the invalidated object. The one or more computer processors instruct the modifier of the invalidated object to retain possession of a first lock on the object beyond the transaction. The one or more computer processors determine that a usage pattern associated with the invalidated object matches a predetermined usage pattern for selecting a lock that can be retained beyond an associated transaction and transmits a second lock a requestor. The one or more computer processors instruct the modifier to release possession of the first lock to the owner and transmit a first image of the current version of the invalidated object to the owner for subsequent transmission to the requestor.

4 Claims, 4 Drawing Sheets

(58) Field of Classification Search
USPC .................................................. 707/714, 704
See application file for complete search history.

(56) References Cited

U.S. PATENT DOCUMENTS

| | | | |
|---|---|---|---|
| 5,864,840 A * | 1/1999 | Leung | G06F 17/30451 707/999.002 |
| 5,913,213 A * | 6/1999 | Wikstrom | G06F 9/52 707/704 |
| 6,473,819 B1 * | 10/2002 | Jackson | G06F 9/52 710/200 |
| 8,209,696 B2 | 6/2012 | Ferguson et al. | |
| 2004/0049636 A1 | 3/2004 | Campbell et al. | |
| 2004/0215772 A1 | 10/2004 | Dinker et al. | |
| 2005/0015393 A1 * | 1/2005 | Styles | G06F 17/30471 707/999.1 |
| 2006/0106765 A1 * | 5/2006 | Froehlich | G06F 17/30451 707/999.003 |
| 2011/0010358 A1 * | 1/2011 | Zane | G06F 17/30471 707/714 |
| 2011/0137861 A1 | 6/2011 | Burnett et al. | |
| 2011/0295836 A1 * | 12/2011 | Bolsius | G06Q 10/10 707/714 |
| 2012/0089735 A1 * | 4/2012 | Attaluri | G06F 17/30362 709/226 |
| 2015/0106542 A1 | 4/2015 | Horikawa | |
| 2015/0277967 A1 * | 10/2015 | Calciu | G06F 9/467 711/147 |

OTHER PUBLICATIONS

U.S. Appl. No. 14/554,280 entitled "Increase Database Performance by Reducing Required Communications and Information Transfers", filed Nov. 26, 2014.

* cited by examiner

INCREASE DATABASE PERFORMANCE BY REDUCING REQUIRED COMMUNICATIONS AND INFORMATION TRANSFERS

BACKGROUND

The present disclosure relates generally to the field of database management systems, and more particularly to increasing the performance of distributed databases. A distributed database ("DDB") is a database in which the storage devices may not all be attached to a common processing unit controlled by a distributed database manage system. A DDB may be stored in multiple computing devices located in the same physical location or dispersed over a network of interconnected computing devices.

A significant factor affecting the efficiency of a DDB is the cost of communications, in particular object locking and transfer, such as a page transfer, during an update. In a database setting, locks are used when multiple users desire to access information concurrently and serve to prevent data from being corrupted or invalidated when multiple users try to write to the database. Invalidated data is information that is false and/or incomplete. In a typical locking mechanism, a user can only modify data to which they have applied a lock for that gives them exclusive access to the data until the lock is released. When the user need to lock a database object for which they do not have a lock for they must request a lock from the database management software. Hence, locking not only provides exclusivity to write but also prevents other users from accessing uncommitted modifications. Typically during a data update, users invoke a commit statement to make data modifications permanent.

For example, the invocation of a commit to complete a database transaction, such as information read or write actions, makes all associated changes visible to other users of the database. Typically, locking is accomplished by a lock manager function that is included in database management software and lock acquisition operations are fully synchronized in nature. However, a user may progress in a transaction without knowing for certain that access to potentially shared data is serialized against changes by other transactions.

SUMMARY

According to embodiments of the present invention, one or more computer processors determine that a predetermined workload threshold associated with an invalidated object is not exceeded and transmits an invalidation command associated with the invalidated object to the owner of the invalidated object. The one or more computer processors instruct the modifier of the invalidated object to retain possession of a first lock on the object beyond the transaction. The one or more computer processors determine that a usage pattern associated with the invalidated object matches a predetermined usage pattern for selecting a lock that can be retained beyond an associated transaction and transmits a second lock a requestor. The one or more computer processors instruct the modifier to release possession of the first lock to the owner and transmit a first image of the current version of the invalidated object to the owner for subsequent transmission to the requestor.

DETAILED DESCRIPTION

Figure 1:
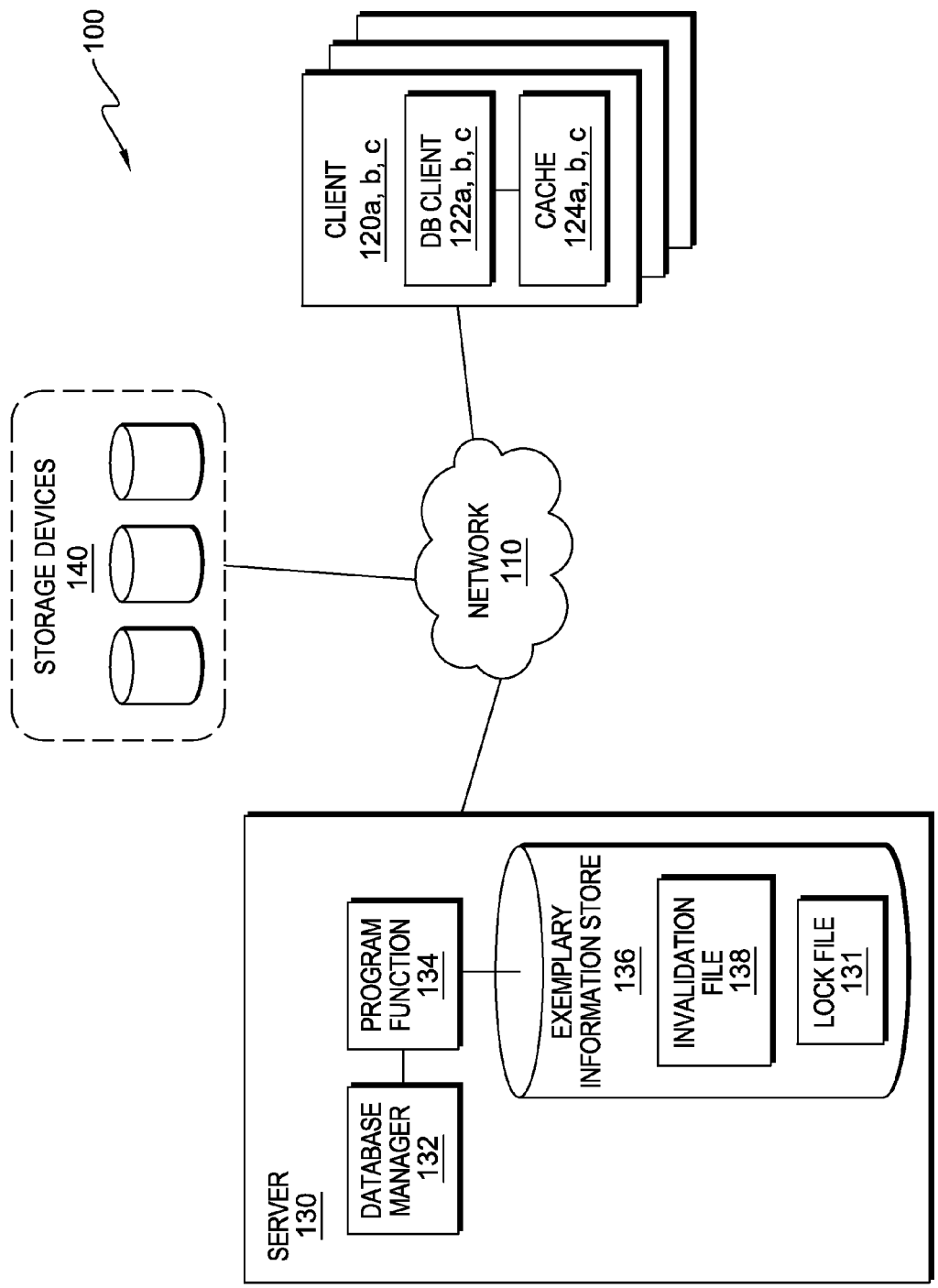
FIG. 1 is a block diagram illustrating an environment, in accordance with an embodiment of the present invention.

With reference now to FIGS. 1-4.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A significant factor affecting the efficiency of a DDB is the cost of communications, in particular locking ("locking") and transfer, such as a page transfer, during an update. In a database setting, locks are used when multiple users desire to access information concurrently and serve to prevent data from being corrupted or invalidated when multiple users try to write to the database. Invalidated data is information that is false and/or incomplete. In a typical locking mechanism, users can only modify that data to which they have applied a lock for that gives them exclusive access to the data until the lock is released. When users need to lock a database object ("object") for which they do not currently have a lock for, they must request a lock. Hence, locking not only provides exclusivity to write but also prevents other users from accessing uncommitted modifications. Typically during a data update, users invoke a commit action to make a data modification permanent.

For example, the invocation of a commit completes database transactions, such as information read or write actions, which make all changes visible to other users. Typically, locking is accomplished by a lock manager function that is included in database management software and lock acquisition operations are fully synchronized in nature. However, may progress in a transaction without knowing for certain that access to potentially shared data is serialized against changes by other transactions. One approach is to acquire and release locks on an as needed basis. Embodiments of the present invention seek to ascertain database object share rates in order to determine which objects should be invalidated, which can reduce page transfers and required communications.

Certain distributed databases require modified pages to be transmitted to the object owner at commit time. The page owner then informs other users interested in a current image of the page that such an image is available by either sending them a message or using a remote direct memory access ("RDMA") to modify a bit on those user computing devices that signifies that their cached page is invalid. In such cases, instead of transmitting a page image to the page owner, an invalidity message is transmitted, and the lock on the invalidated page is retained by the modifying user. Using the invalidation message, the page owner can then remotely modify the associated validity bit for the page on all other user computing devices which have a cached version of the page.

Utilizing RDMA exploitation only a RDMA brokered invalidity message is transmitted, which reduces the messaging cost for page transfers. When additional users require a current version of the page the request goes to the page owner, central or distributed, which informs the user that the requested page is held by another user. Since the user that is holding the page is required to have an update lock on the page, other users desiring the latest page image can request a lock, such as a physical lock, and induce the page owner to transmit a request to reclaim the lock to the page holding user. The lock reclamation causes the page association to be undone and the current version of the page to be transferred to the page owner. The lock type requested may be determined by the required access type; a shared lock for read access or an exclusive lock for write access.

Embodiments of the present invention will now be described in detail with reference to the Figures. FIG. 1 is a block diagram illustrating an environment, generally designated 100, in accordance with one embodiment of the present invention.

Environment 100 includes clients 120a, b, c storage devices 140, and server 130, all interconnected over network 110. Network 110 can be, for example, a local area network (LAN), a wide area network (WAN) such as the Internet, or a combination of the two, and can include wired, wireless, or fiber optic connections. In an embodiment, environment 100 is a distributed computing environment. In general, network 110 can be any combination of connections and protocols that will support communications between server 130, storage devices 140 and clients 120a, b, c, in accordance with an embodiment of the present invention.

Server 130 and clients 120a, b, c may be a laptop computer, a tablet computer, a netbook computer, a personal computer (PC), a desktop computer, a personal digital assistant (PDA), a smart phone, or any programmable electronic device capable of communicating via network 110. Storage devices 140 are information repositories that comprise data that can be in the form of pages, tables, or an applicable data structure. In an embodiment, a page is a unit of storage within a higher level entity such as a table space, in index space and may include one or more rows of a table. In other embodiments, a page is anything that can be created or manipulated by using SQL, such as an index, package, procedure, table, trigger, view, or an XSR object. Storage devices 140 can be distributed storage devices. Although depicted with several storage devices, storage devices 140 can include any number of storage devices, in accordance with an embodiment of the present invention. In an embodiment, storage devices 140 are included in a homogenous or heterogeneous distributed database.

Clients 120a, b, c are computing devices that allow users to access database information and/or services provided by a server, in accordance with an embodiment of the present invention. Clients 120a, b, c include database clients ("DB clients") 122a, b, c which is in communication with cache 124a, b, c, respectively. DB clients 122a, b, c can communicate with each other via remote direct memory access ("RDMA"). RDMA is a method that allows direct memory access from the memory of one computing device into that of another without involving either device's operating system. Cache 124a, b, c are blocks of memory that can transparently store data to improve the servicing of future requests for that stored data. Cache 124a, b, c are also further described below with respect to cache memory 416.

Server 130 is a computing device that facilitates database management, in accordance with an embodiment of the present invention. Specifically, server 130 is a computing device that responds to requests across network 110 to provide, or help to provide, database management services. Server 130 includes database management software 132, program function 134, and exemplary information store 136. Server 130 may include internal and external hardware components, as depicted and described in further detail with respect to FIG. 4. In general, server 130 can be any computing device capable of facilitating database management, in accordance with an embodiment of the present invention.

Exemplary information store 136, which is in communication with program function 134, is an information repository that includes invalidation file 138 and lock file 131. Invalidation file 138 includes one or more invalidation messages, which include information that inform page owners that a page that they have ownership of is currently invalid, for example, as a result of recent edit. Invalidation file 138, which is generated by program function 134, includes information that informs a page owner that an owned page is no longer valid. In certain embodiments, invalidation file 138 identifies invalidated objects and the associated object owner. In other embodiments, invalidation file 138 includes commands that instruct a page owner to invalidate a particular object.

Database manager 132 is in communication with program function 134, in accordance with an embodiment of the present invention. Database manager 132 is software that facilitates the defining, creation, querying, updating, and administration of databases. Database manager 132 can be a database management system whose functionality is distributed across one or more computing devices. Database manager 132 can facilitate the management of a relational database. Database manager 132 can allow users to define, create, query, update, and/or administer information included in storage devices 140.

Database manager 132 can manage information locks ('locks"). A lock is a means of serializing a sequence of events or serializing access to data. Locks prevent concurrent access to database information, which prevent the information from being corrupted or invalidated that can result from, for example, concurrent editing attempts. Any single user can modify information to which they have a lock that gives them exclusive access to the information until the lock is released. Locking not only provides exclusivity to writes but also prevents or controls reading of uncommitted data. A lock can restrict access to information immediately when the lock is requested or when the modifications to the information is updated.

There are various types of applicable locks, which include, but are not limited to, update locks, exclusive locks, shared lock, and sticky lock (discussed below). For example, update locks, which can be associated with rows, blocks, tables, and/or data partitions, allow the lock owner to update data. However, although other users can read the data in the locked object, such users cannot update it. Exclusive locks, which may be associated with rows, blocks, tables, buffer pools, and/or data partitions, allow the lock owner to both read and update data in the locked object. Shared locks, which can be associated with rows, blocks,tables, and/or data partitions, allow the lock owner and other users reading to read, but not update, locked data.

Sticky locks are locks that are acquired and held onto beyond the scope of the currently executing transaction. Here, subsequent transactions on the database member do not need to go to a central lock manager or a lock owner to acquire the lock. Sticky locks are released when the database member is temporarily inactive/disabled or the database member is asked (negotiated) to release the lock by a different database member (discussed further below).

Program function 134 is in communication with server 130 and exemplary information store 136, in accordance with an embodiment of the present invention. Program function 134 is software that improves database performance by reducing required communications and transfers. Program function 134 can monitor commit events within environment 100. Program function 134 can, via network 110, transmit instructions to clients 120a, b, c. Program function 134 can utilize history-based heuristics to determine page and/or lock usage (discussed below). In certain embodiments, program function 134 is in communication with database client 122. In other embodiments, program function 134 can determine the usage pattern for an object by determining their local buffer pool read hit ratio.

In an embodiment, pages transferred by database manager 132 have a validity bit reflective of the current state of the page—valid or invalid. In other embodiments, pages locks transferred by database manager 132 are associated with a history bit field reflecting the history of the page lock. For example, the history bit field can comprise a bit for each time the lock is obtained. When the lock is released without another requestor of the lock, the previous history is left shifted one bit, thereby leaving an open bit for the last history. In this case "0" is entered. If on release of the lock a notification had occurred, the identical shift would occur, but a "1" is entered as the latest history. When the bit field for the page lock is entered for the first time, the most recent history for the object is entered if it exists. When the bit field (history bitmask) is initially created, it is set to all "1's", which may allow a slow aging and progress from unsticky to sticky locks.

Figure 2:
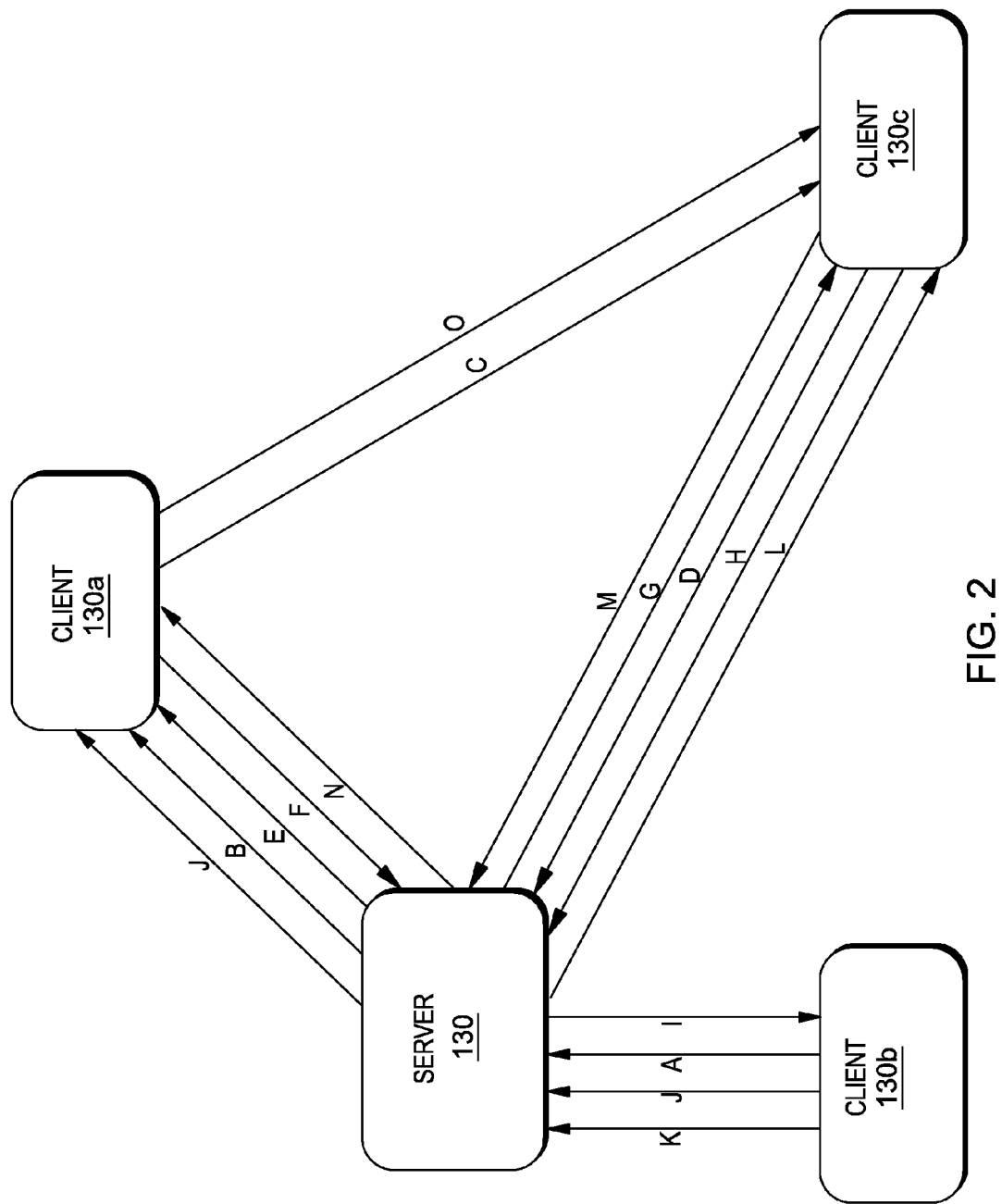
FIG. 2 is a depiction of various transmissions between the server and clients of FIG. 1, in accordance with an embodiment of the present invention.

FIG. 2 is a depiction of various transmissions between server 130 and clients 120a, b, c, in accordance with an embodiment of the present invention. Specifically, FIG. 2 depicts various transmission utilized in reducing database communications and transfers in environment 100. Here, client 130a is the owner of a database object, page XYZ, that is undergoing modification by client 130b ("the page").

For example, page XYZ is associated with a bank account and a user of client 130c desires to update a value on page XYZ, such as to reflect the account balance after a deposit. As such, client 130c requires an image of the current version of page XYZ. Client 130a is the owner of page XYZ. Client 130c has an image of page XYZ stored in cache 124c and desires version thereof. Program function 134 monitors, via network 110, database commit events that occur within environment 100. Subsequent to modifying an image of the page stored in cache 124b, client 120b transmits, via network 110, a commit invalidation request to server 130 (transmission A).

Program function 134 transmits, via network 110, an invalidity command to the page owner, client 130a, that is associated with page XYZ (transmission B). For example, the invalidity command informs client 130b that a modification has been made to page XYZ and that all other cached images must be invalidated. The transmission of an invalidity command is faster than the transmission of an object image, which typically involves the transmission of a large-sized file. In response to receiving the invalidity command, client 130a modifies the validity bit(s) that are associated with the cached image of page XYZ held by client 130c in cache 124c using RDMA (transmission C). Client 130c transmits, via network 110, a page request for an image of page XYZ to server 130 (transmission D).

Server 130 forwards, via network 110, the request to the page owner, client 130a (transmission E). For example, program function 134 receives the request, queries database manager 132 as per the identity of the owner of page XYZ, and transmits, via network 110, the request to the determined owner, client 130a. In response to receiving the request, client 130a notifies program function 134, via server 130, that client 130b is the owner of the current version of page XYZ (transmission F). In response, server 130 transmits the page ownership information to client 130c (transmission G). For example, program function 134 notifies, via network 110, database client 122c that client 130b is the owner of the current version of page XYZ. Client 130c transmits, via network 110, a lock request for page XYZ to server 130 (transmission H). For example, database client 122c transmits a lock request to program function 134 for the current version of page XYZ. In an embodiment, program function 134 determines page ownership using the lock association information included in lock file 131. In other embodiments, when program function 134 detects a lock request, it determines any "1" bits are present in the history.

If so, then program function 134 instructs database manager 132 to assign an unsticky lock. The assignment is a safety precaution because the cost of the notification is high and such a traversal should be avoided until the history reflects that the lock is not frequently contended. In other embodiments, if access to the page is low enough to require a read from the disk and that it is unlikely that another user needs to read it, then program function 134 instructs database manager 132 to assign a sticky lock for any page read from disk until there is a lock negotiation.

In other embodiments, program function 134 can use registration information for a page on all members of the data sharing group to determine if that page is currently registered on any user. In still other embodiments, program function can use page access patterns to determine whether a sticky lock is to be assigned. For example, for any index object based on member number, program function 134 instructs database manager 132 to assign a sticky lock.

Program function 134 instructs database manager 132 to transmit a lock reclaim message to client 130b instructing it to release the lock on page XYZ (transmission I). In response, client 130b transmits the current version of page XYZ to server 130, which then transmits it to client 130a (transmission J). In response, client 130b releases their lock on page XYZ and transmits it to server 130 (transmission K). Server 130 notifies client 130c that the lock for page XYZ is no longer owned by client 130b (transmission L). Client 130c requests the latest version of page XYZ from server 130 (transmission M). In response, server 130 forwards the request for the latest version of page XYZ to client 130a (transmission N). Client 130a transmits, via network 110, an image of the current version of page XYZ to 130c (transmission O).

Figure 3:
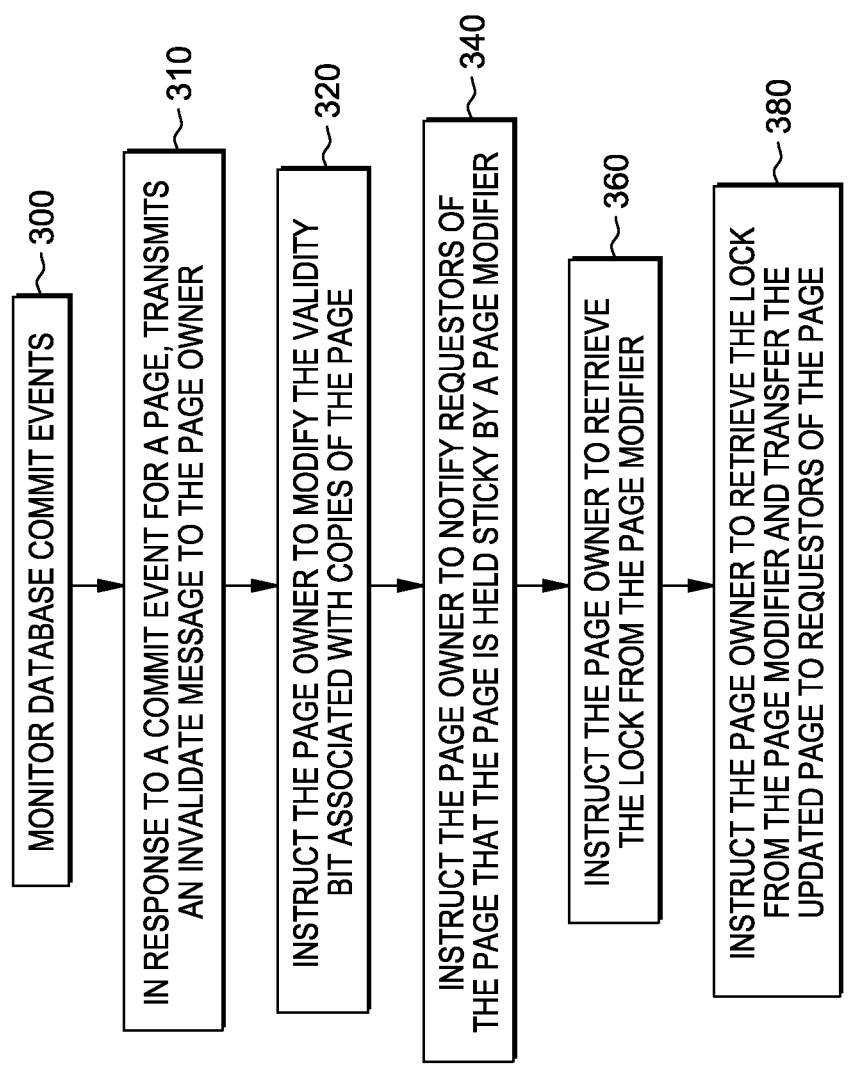
FIG. 3 is a flowchart depicting the operational steps of the program function of FIG. 1, in accordance with an embodiment of the present invention.

FIG. 3 is a flowchart depicting operational steps of program function 134, in accordance with an embodiment of the present invention. In other embodiments, the operational steps of program function 134 are applicable to any database object, which includes, but is not limited to a container, file, table, page, row, column, buffer pool, index, or any logical entity created and stored in a database. Program function 134 monitors database commit events (step 300). Program function 134, in response to a commit event for a page image, transmits an invalidation command to the page owner (step 310). Program function 134 instructs the page owner to modify the validity bits associated with copies of the page (step 320). Program function 134 instructs the page owner to notify the requestors of the page that the page is held by a page modifier (step 340). Program function 134 instructs the page owner to retrieve the lock from the page modifier (step 360). Program function 134 instructs the page owner to retrieve the lock of the page modifier and transfer the updated page to requestors of the page (step 380).

Figure 4:
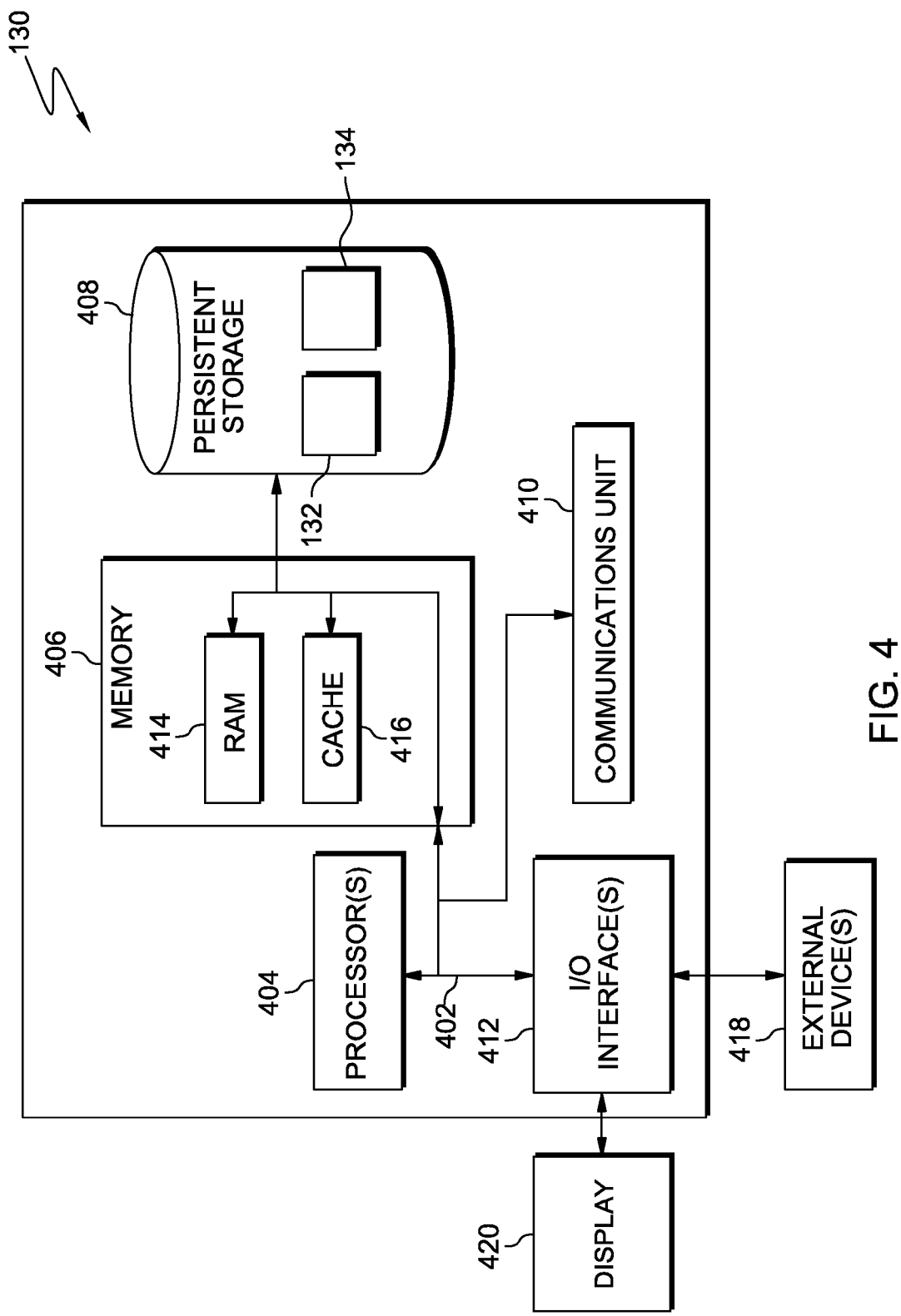
FIG. 4 depicts a block diagram of components of the server executing the program function, in accordance with an embodiment of the present invention.

FIG. 4 depicts a block diagram of components of server 130 and clients a,b,c, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

A non-transitory computer readable storage medium embodiment herein is readable by a computerized device. The non-transitory computer readable storage medium stores instructions executable by the computerized device to perform a method that tests integrated circuit devices to measure a voltage overshoot condition.

Server 130 and clients 120a, b, c each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Program function 134, database manager 132, and exemplary information store 136 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices included in environment 100. In these examples, communications unit 410 includes one or more network interface cards. Communications unit 410 may provide communications through the use of either or both physical and wireless communications links. Program function 134 and database manager 132 may be downloaded to persistent storage 408 through communications unit 410.

I/O interface(s) 412 allows for input and output of data with other devices that may be connected to server 130 or clients 120a, b, c. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., database manager 132, program function 134, and exemplary information store 136, can be stored on such portable computer readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

What is claimed is:

1. A computer program product comprising a computer readable storage medium having stored thereon:
   first computer instructions executable by a device to, responsive to a determination that a page has been invalidated, cause the device to send, from a page modifier to a page owner of the invalidated page, an invalidate message indicative of the invalidated page;
   second computer instructions executable by the device to retain, by the page modifier, an update/physical exclusive lock on the invalidated page, with the update/ physical exclusive lock causing the invalidated page to be held sticky by a page modifier;
   third computer instructions executable by the device to, responsive to receiving the invalidate message, remotely modifying, by the owner of the invalidated page, a validity bit for the invalidated page a plurality of cached versions of the invalidated page;
   fourth computer instructions executable by the device to cause the device to match a usage pattern of the invalidated page to a first predetermined pattern;
   fifth computer instructions executable by the device to cause the device to select a first sticky lock for the predetermined page based, at least in part, upon the matching of the usage pattern and the first predetermined pattern, the update/physical exclusive lock being the first sticky lock;
   sixth computer instructions programmed to receive, by the owner of the invalidated page and from a requester, a request for a latest version of the invalidated page;
   seventh computer instructions executable by the device to cause the device to, responsive to receipt of the request for the latest version of the invalidated page, informing the requester that the latest version of the invalidated page is held as a sticky page by the page modifier;
   eighth computer instructions executable by the device to cause the device to reclaim the update/ physical exclusive lock so that the sticky page is undone and the latest version of the invalidated page is transferred to the page owner; and
   ninth computer instructions executable by the device to cause the device to determine a new physical lock based, at least in part, upon a type of access required.

2. The product of claim 1 wherein the ninth computer instructions are further executable to cause the device to determine new physical lock to have one of the following types: shared lock for read access or an exclusive lock for write access.

3. A system comprising:
   a processor(s) set; and
   a computer readable storage medium, operatively connected to the processor(s) set so that the processor(s) set can execute computer instructions stored on the computer readable storage medium, with the computer readable storage medium having stored thereon:
   first computer instructions executable by a device to, responsive to a determination that a page has been invalidated, cause the device to send, from a page modifier to a page owner of the invalidated page, an invalidate message indicative of the invalidated page,
   second computer instructions executable by the device to retain, by the page modifier, an update/physical exclusive lock on the invalidated page, with the update/physical exclusive lock causing the invalidated page to be held sticky by a page modifier,
   third computer instructions executable by the device to, responsive to receiving the invalidate message, remotely modifying, by the owner of the invalidated page, a validity bit for the invalidated page a plurality of cached versions of the invalidated page,
   fourth computer instructions executable by the device to cause the device to match a usage pattern of the invalidated page to a first predetermined pattern,
   fifth computer instructions executable by the device to cause the device to select a first sticky lock for the predetermined page based, at least in part, upon the matching of the usage pattern and the first predetermined pattern, the update/physical exclusive lock being the first sticky lock,
   sixth computer instructions programmed to receive, by the owner of the invalidated page and from a requester, a request for a latest version of the invalidated page,
   seventh computer instructions executable by the device to cause the device to, responsive to receipt of the request for the latest version of the invalidated page, informing the requester that the latest version of the invalidated page is held as a sticky page by the page modifier,
   eighth computer instructions executable by the device to cause the device to reclaim the update/ physical exclusive lock so that the sticky page is undone and the latest version of the invalidated page is transferred to the page owner, and
   ninth computer instructions executable by the device to cause the device to determine a new physical lock based, at least in part, upon a type of access required.

4. The system of claim 3 wherein the ninth computer instructions are further executable to cause the device to determine new physical lock to have one of the following types: shared lock for read access or an exclusive lock for write access.

* * * * *